United States Patent [19]

Kodama et al.

[11] Patent Number: 4,728,484
[45] Date of Patent: Mar. 1, 1988

[54] APPARATUS FOR HANDLING CONTROL ROD DRIVE

[75] Inventors: Toshihiro Kodama, Hitachi; Yoshimi Ishii, Kitaibaraki; Isao Kouga, Hitachi; Noriaki Mase, Hitachi; Noriaki Hattori, Hitachi, all of Japan

[73] Assignee: Hitachi, Ltd., Tokyo, Japan

[21] Appl. No.: 751,594

[22] Filed: Jul. 3, 1985

[30] Foreign Application Priority Data

Jul. 4, 1984 [JP] Japan .................. 59-139517

[51] Int. Cl.⁴ .......................................... G21C 19/20
[52] U.S. Cl. ................................................. 376/260
[58] Field of Search ............... 376/260, 268, 269; 414/146

[56] References Cited

U.S. PATENT DOCUMENTS

| | | | |
|---|---|---|---|
| 3,186,915 | 6/1965 | Danieli et al. | 376/260 |
| 4,158,600 | 6/1979 | Akimoto et al. | 376/260 |
| 4,288,290 | 9/1981 | Saima et al. | 376/260 |
| 4,292,133 | 9/1981 | Sasaki et al. | 376/260 |
| 4,518,559 | 5/1985 | Fischer et al. | 376/260 |

FOREIGN PATENT DOCUMENTS

| | | | |
|---|---|---|---|
| 0029596 | 3/1977 | Japan | 376/260 |
| 0044393 | 4/1977 | Japan | 376/260 |
| 0013096 | 2/1978 | Japan | 376/260 |
| 0122092 | 10/1978 | Japan | 376/260 |
| 0035593 | 3/1979 | Japan | 376/260 |
| 0038495 | 3/1979 | Japan | 376/260 |
| 0098494 | 8/1979 | Japan | 376/260 |
| 0125393 | 9/1979 | Japan | 376/260 |
| 0145893 | 11/1979 | Japan | 376/260 |
| 0084195 | 5/1984 | Japan | 376/260 |
| 0097297 | 5/1985 | Japan | 376/260 |

*Primary Examiner*—Deborah L. Kyle
*Assistant Examiner*—Daniel Wasil
*Attorney, Agent, or Firm*—Antonelli, Terry & Wands

[57] ABSTRACT

An apparatus for handling a control rod driving mechanism (CRD) of a nuclear reactor. The apparatus has a turn carriage provided in a space within a reactor container where a pedestal is provided, and is adapted to turn on a rail provided on the inner peripheral wall of the container. The turn carriage carries a truck adapted to run along a rail on the turn carriage. A mast is provided on the truck and is driven by a mast driving means between an upright position and a horizontal position. The mast is designed for accommodating a CRD cart. The apparatus also has a CRD mounting-/demounting means secured to the mast and adapted to be moved up and down by the CRD cart such as to mount and demount the CRD in and from a CRD housing.

9 Claims, 8 Drawing Figures

APPARATUS FOR HANDLING CONTROL ROD DRIVE

BACKGROUND OF THE INVENTION

The present invention relates to an apparatus for handling a control rod driving mechanism of a nuclear reactor. More particularly, the invention is concerned with an improvement in an apparatus for mounting and demounting, at the time of periodical inspection of a nuclear reactor, the control rod driving mechanism on and from a housing attached to the pressure vessel of a nuclear reactor, as well as for transporting the control rod driving mechanism to and from a place suitable for inspection and maintenance.

The control rod driving mechanism (referred to as "CRD", hereinunder) has to be demounted and then mounted at the time of periodical inspection of the nuclear reactor. The handling of CRD essentially requires a suitable countermeasure for reducing the radioactive dosage, because the work for handling CRD has to be done in an atmosphere of a high rate of radioactive dosage.

The specification of U.S. Pat. No. 4,292,133 discloses an apparatus for replacement of CRD. This apparatus has a CRD mounting/demounting means and a CRD transporting means which are constructed separately, such that the replacement of the CRD is conducted by cooperation between these two means. These two means are equipped with respective trucks for carrying the CRD. In order that the cooperation between these two means can be conducted satisfactorily, it is essential that the trucks of both means are aligned with each other at a high precision. In the replacement of CRD, it is necessary to operate a mast driving mechanism such as to horizontally lay down the mast in advance to the transportation of the CRD to and from the mounting position. This in turn requires the CRD mounting-/demounting means to clear the mast because the mast has a large length. The replacement of the CRD which is disposed in the peripheral region of the reactor and, hence, closest to a pedestal, requires the greatest care in order to avoid any risk of interference between various equipments and pipes on the pedestal wall and the CRD mounting/demounting means of the apparatus when this means is retracted in advance of the horizontal laying down of the mast. To avoid this risk, hitherto, a visual check or observation of the clearance between the pedestals and the CRD mounting/demounting sections by the operator has been necessary.

SUMMARY OF THE INVENTION

Accordingly, an object of the invention is to provide an apparatus for handling a CRD which is improved such that the positioning of this apparatus is remarkably facilitated.

Another object of the invention is to provide an apparatus which can eliminate the necessity for the visual check or observation of the space in which the pedestals are disposed.

Still another object is to obtain a compact CRD handling apparatus.

To these ends, according to the invention, there is provided an apparatus for handling a control rod driving mechanism (CRD) comprising: a turn carriage provided in a space within a reactor container where a pedestal is provided; a truck adapted to run along the turn carriage; a mast provided on the truck; a mast driving means for driving the mast between an upright position and a horizontal position; a CRD cart accommodated by the mast; and a CRD mounting/demounting means secured to the mast and adapted to be moved up and down by the CRD cart such as to mount and demount the CRD in and from a CRD housing.

The above and other objects, features and advantages of the invention will become clear from the following description of the preferred embodiments when the same is read in conjunction with the accompanying drawings.

BRIEF DESCRIPTION OF THE PREFERRED EMBODIMENTS

DESCRIPTION OF THE PREFERRED EMBODIMENT

Before turning to the description of the preferred embodiment of the invention, a description will be made with specific reference to FIG. 8 as to a conventional CRD handling apparatus.

Figure 8:
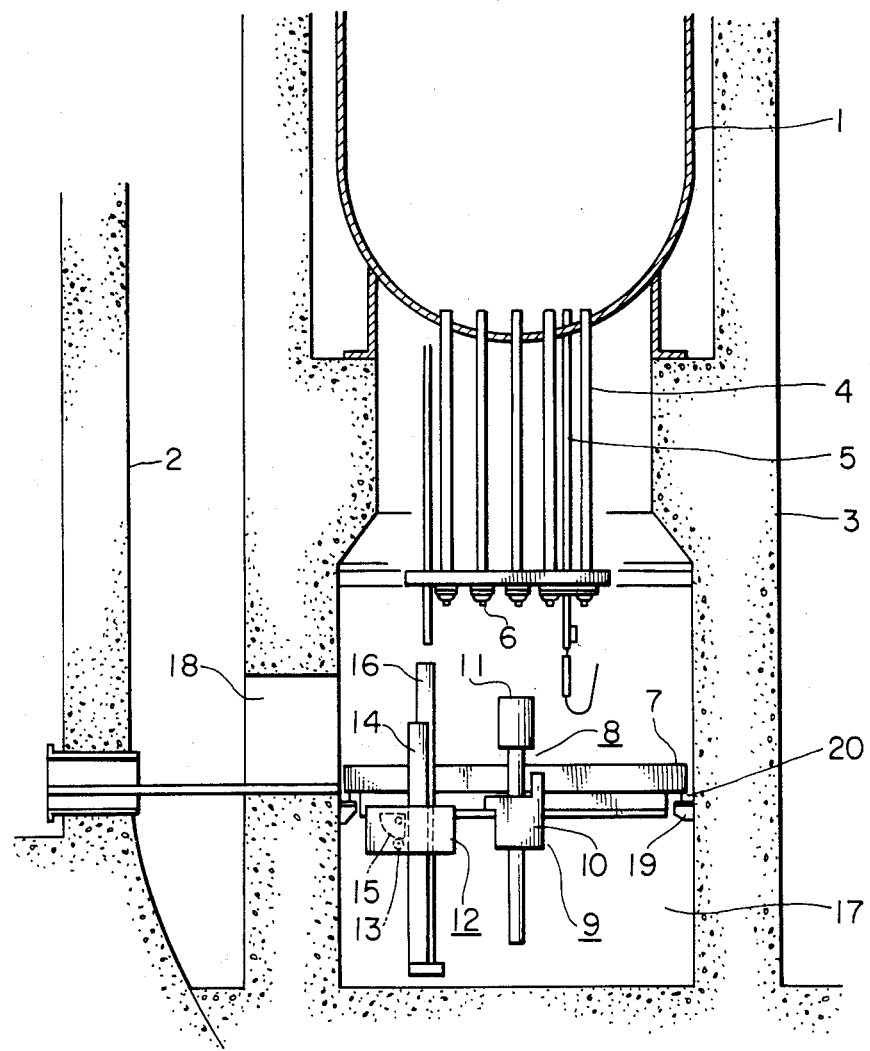
FIG. 8 is an illustration of the whole portion of a conventional CRD handling apparatus in which a CRD mounting/demounting means and the CRD transporting means are constructed separately.

In FIG. 8, a reference numeral 1 designates a pressure vessel of a nuclear reactor which is disposed in a container 2 of the nuclear reactor and situated on a pedestal 3. CRD housings 4 and neutron measurement housings 5 are projected into the pressure vessel 1 from the lower side thereof. Thus, the CRD housings 4 and the neutron measurement housings 5 are constituents of the pressure vessel 1 of the nuclear reactor. Each CRD housing 4 accommodates a CRD 6 which is secured to the housing 4 usually by 8 (eight) bolts. A Law requires an inspection and maintenance of the CRD every five years.

To this end, a series of operation is necessary for demounting the CRD 6 from the CRD housing 4, transporting the demounted CRD to and from a suitable place and then mounting the CRD on the CRD housing 4. In order to conduct this series of operations automatically, it has been a common measure to use a CRD handling apparatus which is generally designated at a numeral 8 in FIG. 8. The CRD handling apparatus is usually disposed under the pressure vessel 1 within the space 17 where the pedestal 3 is provided. An annular bracket 19 is secured to the inner peripheral wall of the pedestal 3. An annular rail 20 is laid on the bracket 19. The CRD handling apparatus 8 is designed for rotating within a horizontal plane on the annular rail 20.

This conventional CRD handling apparatus has a CRD mounting/demounting means 9 and a CRD transporting means 12 which are constructed separately.

The CRD mounting/demounting means 9 includes a turn carriage 7, a truck 10 adapted for running along a rail provided on the turn carriage 7, and a CRD mounting/demounting header 11 which has various functions such as fitting and removal of bolts for mounting the CRD, coupling and uncoupling of CRD 6 from the control rod, and disposal of drain from the CRD housing 4 and the CRD 6. The CRD transporting means 12 has a truck 13 adapted to run along a rail on the turn carriage 7, a mast 14, a mast driving mechanism 15 adapted for driving the mast 14 between an upright position and a horizontal position, and a CRD cart 16 capable of being stored by the mast and designed for inserting and withdrawing the CRD into and out of the CRD housing 4.

The conventional CRD handling apparatus 8 having the described construction is capable of demounting, transporting and mounting the CRD by a cooperation between the CRD mounting/demounting means 9 and the CRD transporting means 12.

More specifically, the CRD 6 which has been demounted from the CRD housing 4 by the operation of the header 11 of the CRD mounting/demounting means 9 is delivered to the CRD cart 16 of the CRD transporting means 12 which in turn takes out the CRD 6 from the CRD entrance opening 18 after the mast 14 has been laid horizontally by the operation of the mast driving mechanism 15. The CRD 6 thus taken out is then transported to a suitable place for inspection and maintenance work.

The mounting of the CRD 6 on the CRD housing 4 is conducted in a sequence which is reverse to the mounting sequence explained hereinbefore.

This conventional CRD handling apparatus has encountered the problems explained before in connection with the explanation of the prior art.

These problems are overcome by the CRD handling apparatus of the invention as will be understood from the following description of the preferred embodiment when the same is read in conjunction with the accompanying drawings.

Figure 1:
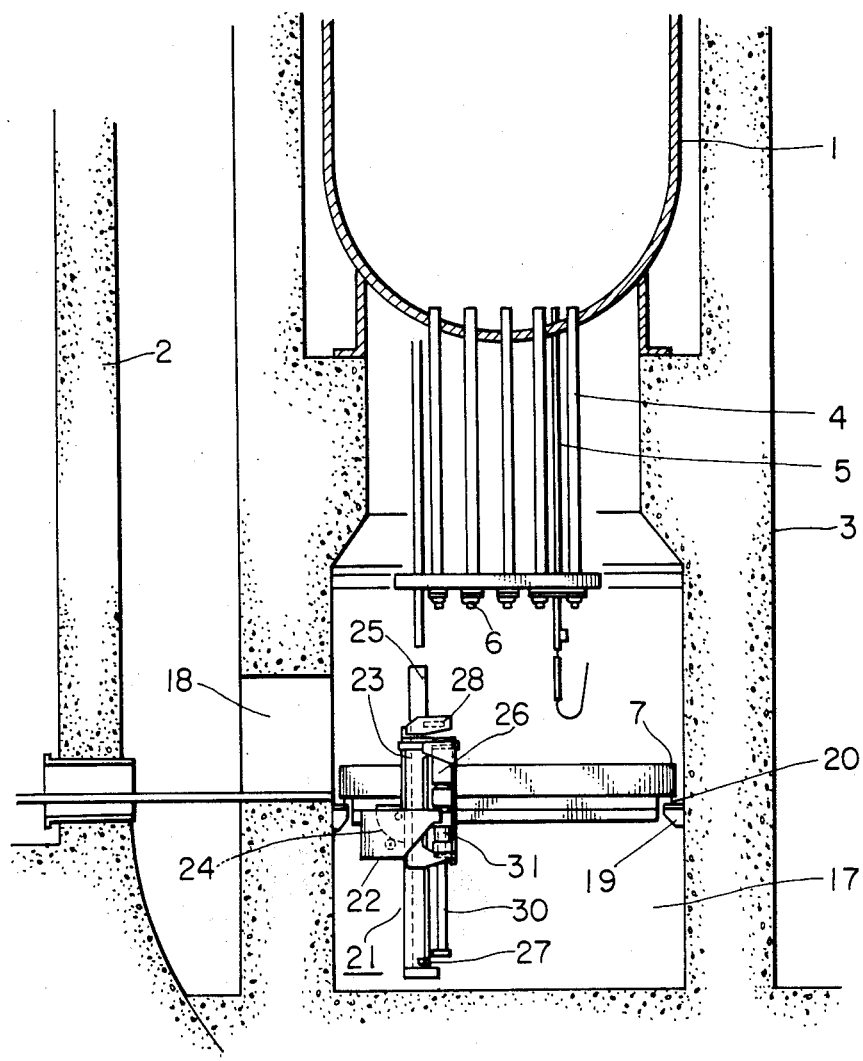
FIG. 1 is an illustration of the whole portion of a CRD handling apparatus in accordance with the invention in a state in which a CRD handling/transporting means of the apparatus is in an upright position.
Figure 2:
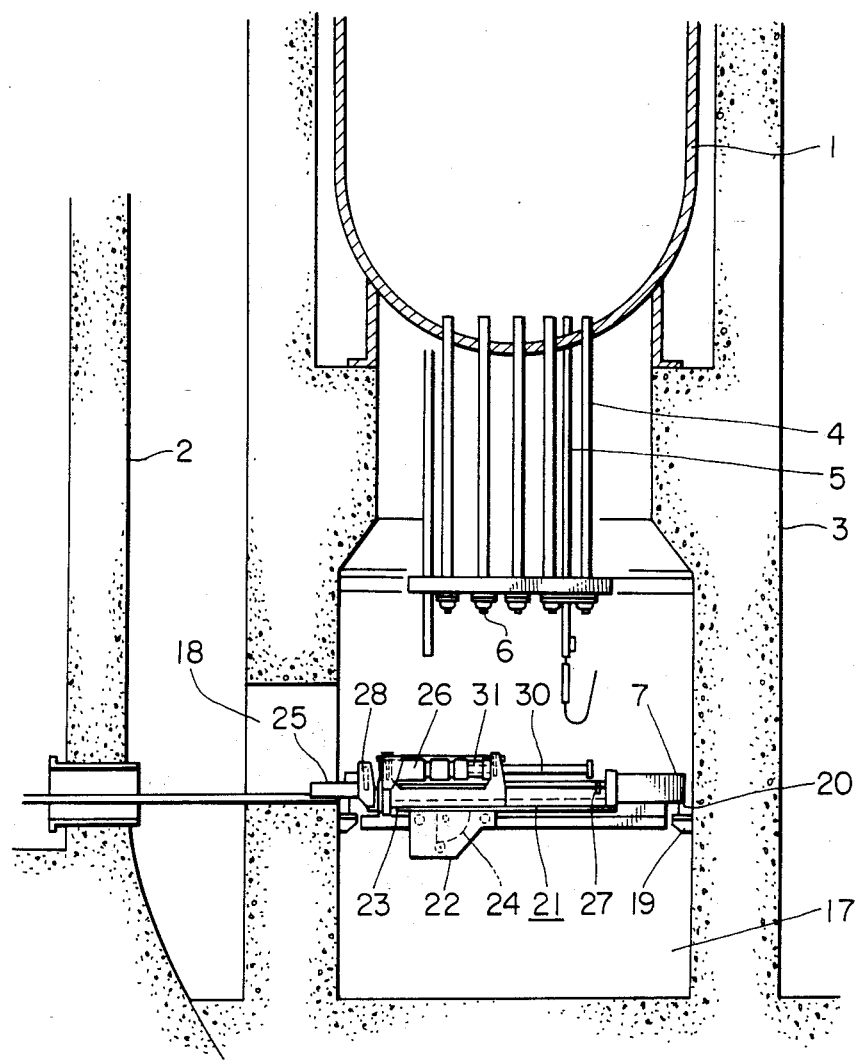
FIG. 2 is an illustration of the whole portion of an apparatus in a state in which the CRD handling/transporting means are laid horizontally.

FIG. 1 shows the whole portion of a CRD handling apparatus of the invention in a state in which a CRD mounting/demounting means is in an upright posture, while FIG. 2 shows the apparatus in a state in which the CRD mounting/demounting means has been laid horizontally. In these Figures, the same reference numerals are used to denote the same parts or members as those appearing in FIG. 8.

Referring to FIGS. 1 and 2, a reference numeral 21 generally designates a CRD handling apparatus of the invention which is capable of mounting and demounting CRD to and from a CRD housing 4, as well as transporting the same, by an automatic and remote-controlled operation for the purpose of inspection and maintenance of the CRD 6. As in the case of the conventional apparatus shown in FIG. 8, the CRD handling apparatus 21 is disposed under the pressure vessel 1 of the nuclear reactor, within the space 17 in which the pedestal 3 is provided. An annular rail 20 is laid on a bracket 19 provided on the inner peripheral surface of the pedestal 3. The CRD handling apparatus generally designated at a numeral 21 is adapted to rotate within a horizontal plane along the rail 20. As will be explained later, the CRD handling apparatus 21 of the invention has a CRD mounting/demounting means and a CRD transporting means which are constructed as a unit with each other such as to constitute a CRD handling means.

More specifically, according to the invention, the CRD handling means includes a truck 22 designed for running along a rail on a turn carriage 7, a mast 23, a mast driving mechanism 24 for driving the mast 23 between an upright position and a horizontal position, a CRD cart 25 capable of being stored by the mast and designed for inserting and withdrawing the CRD 6 to and from the CRD housing 4, and a CRD mounting/demounting header having various functions such as the fitting and removal of bolts for fixing the CRD 6, coupling and uncoupling of the CRD 6 to and from the control rod, and disposal of drain from the CRD housing 4 and the CRD 6.

Figure 3:
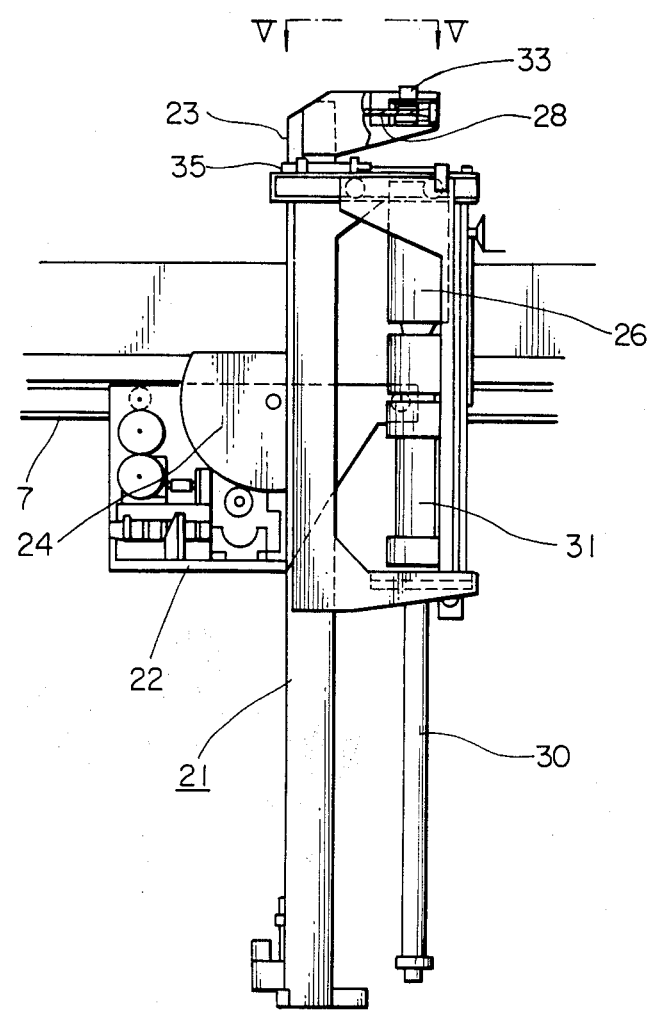
FIG. 3 is an enlarged view showing the detail of the CRD handling/transporting means which constitutes an essential part of the CRD handling apparatus of the invention.
Figure 4:
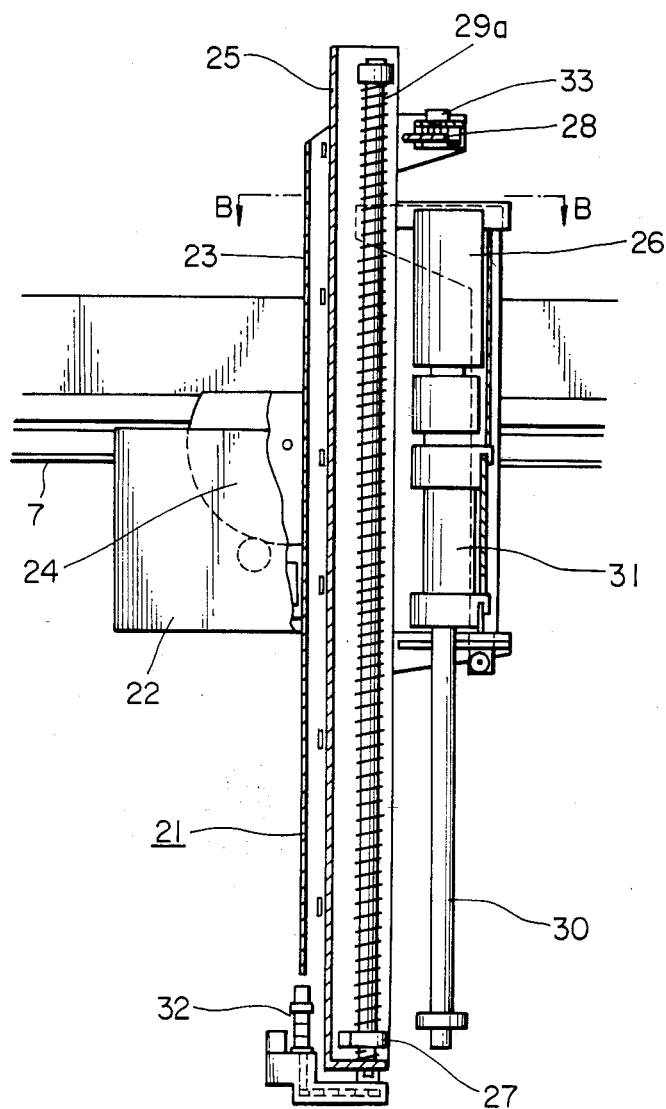
FIG. 4 is an enlarged view of a portion of the apparatus shown in FIG. 1, illustrating in particular the CRD handling/transporting means accommodating a CRD cart.
Figure 5:
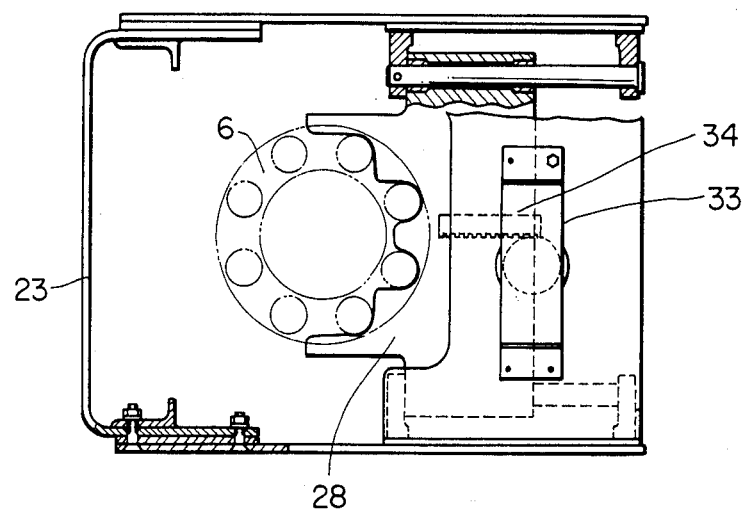
FIG. 5 is a view taken along the line V—V of FIG. 3.
Figure 6:
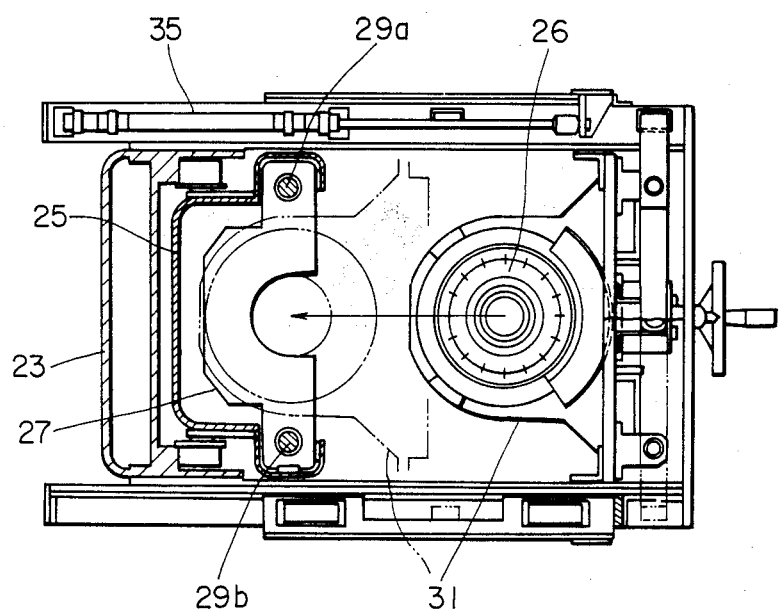
FIG. 6 is a sectional view taken along the line B—B of FIG. 4.

FIG. 3 is an enlarged view showing the detail of the CRD mounting/demounting means which constitutes an essential portion of the apparatus in accordance with the invention. In this FIGure, the CRD cart 25 has been removed from the mast 23 for the purpose of clarification of the drawings. FIG. 5 is a view taken in the direction of arrows V—V of FIG. 3, while FIG. 6 is a sectional view taken along the line B—B of FIG. 4.

The mounting of the CRD 6 to the CRD housing 4 is conducted in a manner which will be explained hereinunder. Namely, the CRD 6 is placed on the lifter 27 of the CRD cart 25 shown in FIG. 4 and then the CRD cart 25 is mounted on the mast 23. Then, the CRD is raised to the position of a CRD supporting member 28 of the mast 23 by the operation of the lifter 27. The lifter 27 carried by the CRD cart 25 engages with a pair of screw rods 29a and 29b which are adapted to be rotated by means of a pneumatic motor 32, such that the lifter 27 is moved up and down along the screw rods 29a and 29b as these shafts are driven by the pneumatic motors. When the CRD is stopped at the designated position where the CRD can be supported by the CRD supporting member 28, the CRD supporting member 28 is moved horizontally by the operation of a rack 34 which is actuated by a rotary actuator 33, such as to support the CRD. After the supporting of the CRD by the supporting member, the lifter 27 is lowered and the CRD mounting/demounting header 26 secured to the mast 23 is moved by the operation of the cylinder 35 to the position just under the CRD. After the CRD mounting/demounting header 26 has been moved to the position just under the CRD, the lifter 27 is raised again such as to lift a lift pipe 30 secured to the lower end of the CRD mounting/demounting header 26, thereby placing the CRD on the CRD mounting/demounting header 26. The CRD supporting member 28 is then moved to the starting position. Subsequently, the lift pipe 30 of the CRD mounting/demounting header 26 is further raised by the operation of the lifter 27, such as to insert the CRD into the CRD housing. Then, the CRD mounting bolts are tightened by a wrench on the CRD mounting/demounting header 26, thus completing the mounting of the CRD on the CRD housing 4.

The demounting of the CRD from the CRD housing is conducted by the following procedure. As the first step, the lift pipe 30 of the CRD mounting/demounting header 26 is set on the lifter 27 of the CRD cart 25, and the lifter 27 is raised to lift the lift pipe 30, thus setting the CRD mounting/demounting header 26 on the CRD to be demounted. Then, the CRD mounting bolts are loosened by the wrench on the CRD mounting-/demounting header 26 and the lifter 27 is lowered after the disposal of the drain from the CRD housing and the CRD. The lifter 27 is stopped when the CRD has reached at the position of the CRD supporting member 28 and then the CRD supporting member 28 is moved horizontally such as to support the CRD. A subsequent downward movement of the lifter 27 causes also the lift pipe 30 to move downwardly. The downward movement of the pipe 30, however, is limited by the abutment of the lower end of the CRD mounting/demounting header 26 and a bearing 31, so that the further downward movement of the lifter 27 causes the lift pipe 30 to be moved apart from the lifter 27. In this state, the CRD mounting/demounting header 26 is moved horizontally to the initial position and then the lifter 27 is moved upwardly until it carries the CRD. The lifter 27 is then stopped in this state. Thereafter, the CRD supporting member 28 is moved horizontally to the initial position and the lifter 27 is moved downwardly to the starting position. Thereafter, the CRD is accommodated by the CRD cart 25. The operation for laying the mast 23 horizontally by the mast driving mechanism 24 is identical to that in the conventional apparatus.

Figure 7:
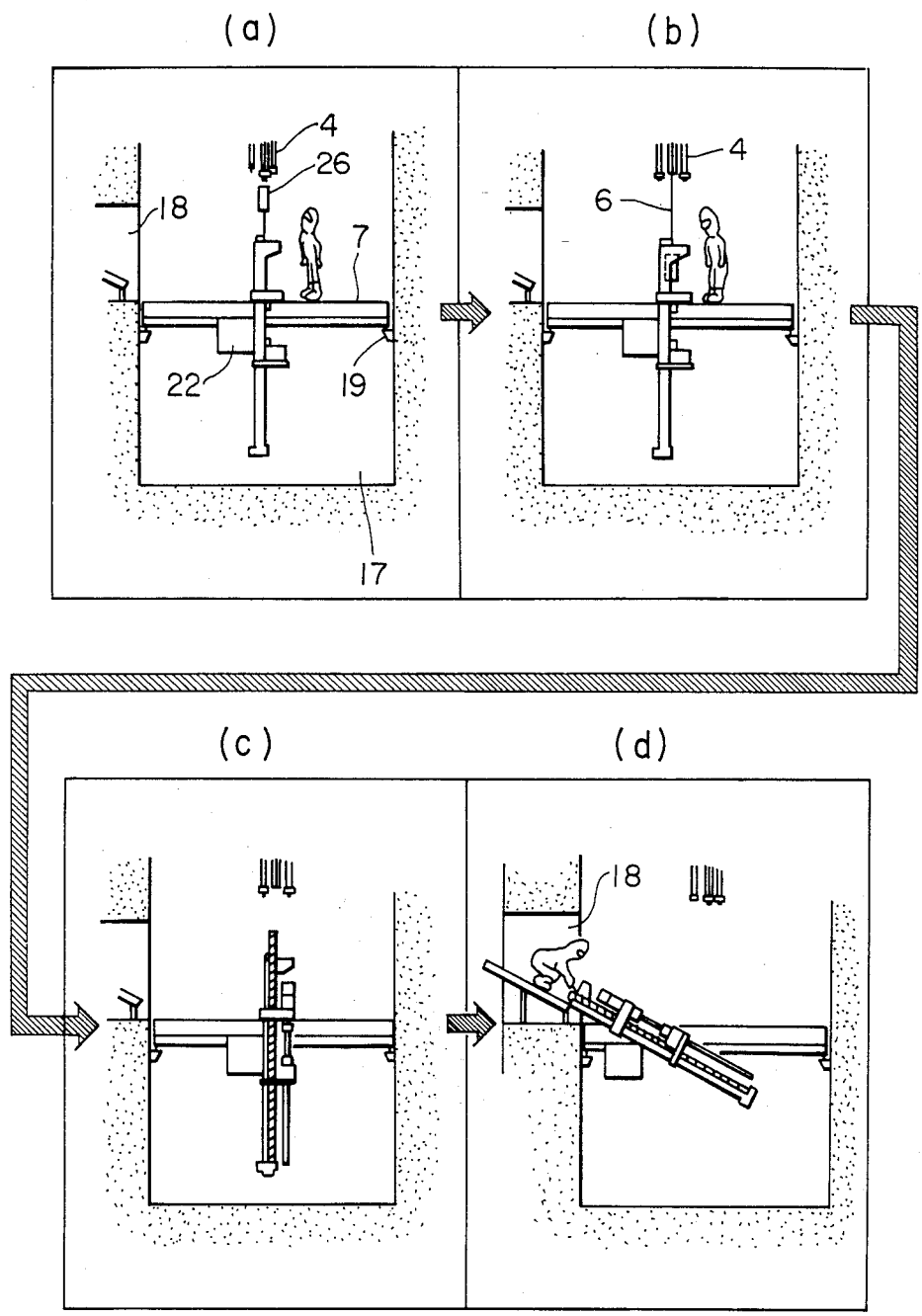
FIG. 7 is an illustration of the procedure in which the CRD is demounted.

FIGS. 7a to 7d illustrate the procedure in accordance with which a CRD is demounted from a CRD housing 4 by an embodiment of the CRD handling apparatus of the invention. More specifically, FIG. 7a shows a step in which the CRD mounting/demounting header 26 has been raised and positioned above the CRD to be demounted, while FIG. 7b is an illustration of the step in which the CRD 6 is being withdrawn from the CRD housing 4. FIG. 7c is an illustration of the step in which the CRD 6 has been fully extracted from the CRD housing 4 and being received by the CRD cart 25. FIG. 7d shows the step in which the CRD is being taken out of the container together with the CRD cart 25. The mounting of the CRD in the CRD housing can be conducted by taking the illustrated steps in the reverse sequence.

As has been described, according to the invention, the CRD mounting/demounting means and the CRD transporting means are constructed as a unit with each other, in contrast to the conventional apparatus in which the CRD mounting/demounting means and the CRD transporting means are constructed separately. In addition, the CRD transporting means is provided with a lifter for lifting and lowering the CRD mounting means. As stated before, in the conventional apparatus which is generally designated by a numeral 8 in FIG. 8, the CRD mounting/demounting means 9 and the CRD transporting means 12 are constructed separately from each other so that it is necessary to employ a suitable means for delivering the CRD from the CRD mounting/demounting means 9 to the CRD transporting means 12 and vice versa, and also to attain a high accuracy of positioning of the truck 10 in the CRD mounting/demounting means 9 and the truck 13 for the CRD transporting means 12.

It will be seen that the apparatus of the invention eliminates all such necessity by virtue of the integral construction of the CRD mounting/demounting means and the CRD transporting means and also by virtue of the provision of the lifter on the CRD transporting means. Thus, the apparatus of the invention remarkably facilitates the positioning thereof during the handling of CRD as compared with the conventional apparatus.

In addition, the conventional apparatus 8 shown in FIG. 8 requires the CRD mounting/demounting means 9 to be retracted to clear the mast 14 when the mast 14 is being turned and laid horizontally, causing a risk of interference between the retracted CRD mounting-/demounting means 9 and various equipments and pipes attached to the wall of the pedestal 3, particularly when the CRD to be replaced is in the peripheral region near the pedestal 3. According to the invention, since the retraction of the CRD mounting/demounting means 9 is not necessary, the above-mentioned risk of interference is avoided so that the operator is relieved from the work for visually observing the space 17 in which the pedestal 3 is provided.

The integral construction between the CRD mounting/demounting means 9 and the CRD transporting means 12 permits a compact construction of the CRD handling apparatus 21 as a whole, which in turn permits an efficient use of the restricted space 17 in which the pedestal 3 is provided.

As has been described, the present invention offers the following advantages. First of all, it is to be noted that the positioning of the CRD handling apparatus can be facilitated remarkably. In addition, the necessity for the visual check which has been hitherto required is eliminated. Furthermore, a compact construction of the CRD handling apparatus can be obtained.

What is claimed is:

1. An apparatus for handling a control rod driving mechanism (CRD), comprising:
   a turn carriage provided in a pedestal space below a pressure vessel of a nuclear reactor;
   a truck adapted to run along a rail arranged on said turn carriage;
   CRD conveyor means arranged for being transferred into and out of said pedestal space with said CRD contained therein from and to a space for at least one of inspection and maintenance of said CRD, said CRD conveyor means including lifter means movable therein in a longitudinal direction of said conveyor means with said CRD mounted thereon so as to shift said CRD to and from a CRD housing disposed under said pressure vessel;
   holding means for removably holding said conveyor means, said holding means being mounted on said truck and being rotatable between an upright position and a horizontal position in said pedestal space;
   CRD mounting/demounting means for enabling mounting of said CRD to said CRD housing and for enabling demounting of said CRD from said CRD housing, said mounting/demounting means including means fixedly attached to said holding means and means movable transversely of said holding means onto and from said lifter means, said mounting/demounting means being arranged for vertical shifting by said lifter means; and
   CRD supporting means arranged on said holding means for temporarily supporting said CRD during movement of said CRD between sid CRD conveyor means and said CRD mounting/demounting means.

2. An apparatus according to claim 1, wherein said CRD mounting/demounting means includes mounting-/demounting header means for enabling fitting and removing of bolts for fixing said CRD to said CRD housing and for enabling coupling and uncoupling of a control rod to and from said CRD.

3. An apparatus according to claim 2, wherein said CRD mounting/demounting means further includes a bearing attached to said holding means, and a lift pipe arranged for up and down movement by said lifter means of said CRD conveyor means while being guided by said bearing, said mounting/demounting header means being secured to an upper end of said lift pipe.

4. An apparatus according to claim 3, wherein said bearing is secured to said holding means through a cylinder so that said CRD mounting/demounting means is moved onto said lifter means of said CRD conveyor means when said bearing is moved towards said CRD conveyor means by the action of said cylinder.

5. An apparatus according to claim 3, wherein said CRD mounting/demounting means enables disposing of a drain from said CRD housing and said CRD.

6. An apparatus according to claim 1, wherein said lifter means of said CRD conveyor means engages a screw rod so that said lifter means is moved up and down in response to rotation of said screw rod.

7. An apparatus according to claim 1, wherein said CRD supporting means is provided on an upper end of said holding means.

8. An apparatus according to claim 7, wherein said CRD supporting means is arranged for movement towards said CRD conveyor means so as to support said CRD in said CRD conveyor means.

9. An apparatus for handling a control rod driving mechanism (CRD), comprising:
 a turn carriage provided in a pedestal space below a pressure vessel of a nuclear reactor;
 a truck adapted to run along a rail arranged on said turn carriage;
 CRD conveyor means arranged for being transferred into and out of said pedestal space with said CRD contained therein from and to a space for at least one of inspection and maintenance of said CRD, said CRD conveyor means including lifter means movable therein in a longitudinal direction of said conveyor means with said CRD mounted thereon so as to shift said CRD to and from a CRD housing disposed under said pressure vessel;
 holding means for removably holding said conveyor means, said holding means being mounted on said truck and being rotatable between an upright portion and a horizontal position in said pedestal space;
 CRD mounting/demounting means for enabling mounting of said CRD to said CRD housing and for enabling demounting of said CRD from said CRD housing, said mounting/demounting means including means fixedly attached to said holding means and means movable transversely of said holding means onto and from said lifter means; and
 CRD supporting means for temporarily supporting said CRD during movement of said CRD between said CRD conveyor means and said CRD mounting/demounting means.

* * * * *